W. GÖRGEY.
SNOW MELTING DEVICE.
APPLICATION FILED FEB. 16, 1917. RENEWED JAN. 29, 1919.

1,298,200.

Patented Mar. 25, 1919.
2 SHEETS—SHEET 1.

Inventor
William Görgey
By his Attorney
Oscar Geier

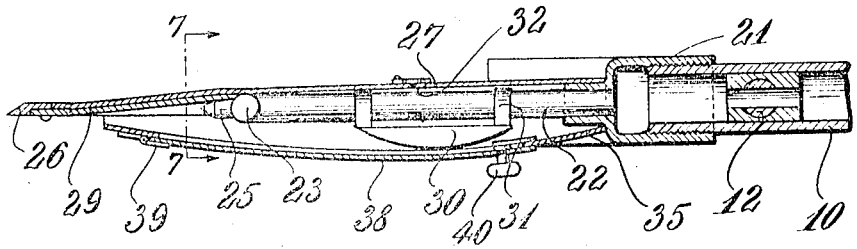
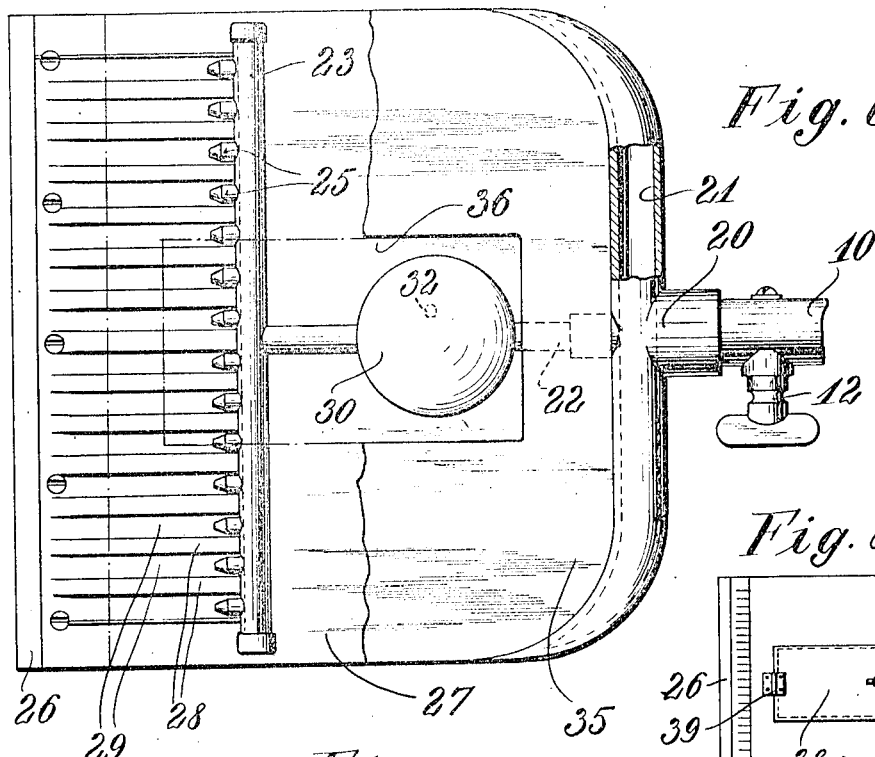
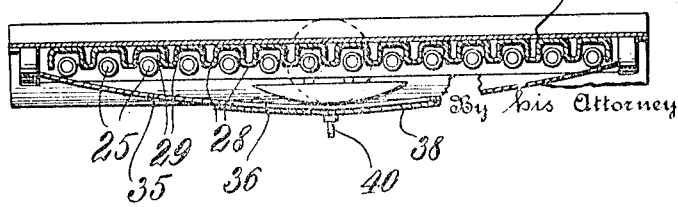
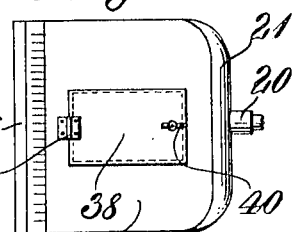

UNITED STATES PATENT OFFICE.

WILLIAM GÖRGEY, OF SOUTH BETHLEHEM, PENNSYLVANIA, ASSIGNOR OF ONE-HALF TO JULIUS WACULIK, OF SOUTH BETHLEHEM, PENNSYLVANIA.

SNOW-MELTING DEVICE.

1,298,200.  Specification of Letters Patent.  Patented Mar. 25, 1919.

Application filed February 16, 1917, Serial No. 149,143. Renewed January 25, 1919. Serial No. 273,272.

*To all whom it may concern:*

Be it known that I, WILLIAM GÖRGEY, a subject of the Emperor of Hungary, resident of South Bethlehem, county of Northampton, and State of Pennsylvania, have invented certain new and useful Improvements in Snow-Melting Devices, of which the following is a specification.

This invention relates to improvements in apparatus for removing snow, and has as its principal object the provision of means which may be manually operated in the manner of a shovel, combined with which are heating devices whereby the melting of the snow is accomplished.

This and other like objects are attained by the novel design, construction and combination of parts hereafter described and shown in the accompanying drawings, forming a material part of this specification, and in which:—

Fig. 5 is a partial longitudinal sectional view of the implement head.

Fig. 6 is a partial bottom plan view of the same, parts being broken away to disclose the construction.

Fig. 7 is a transverse sectional view taken on line 7—7 of Fig. 5, and

Fig. 8 is another bottom plan view drawn to a smaller scale.

Figure 1:
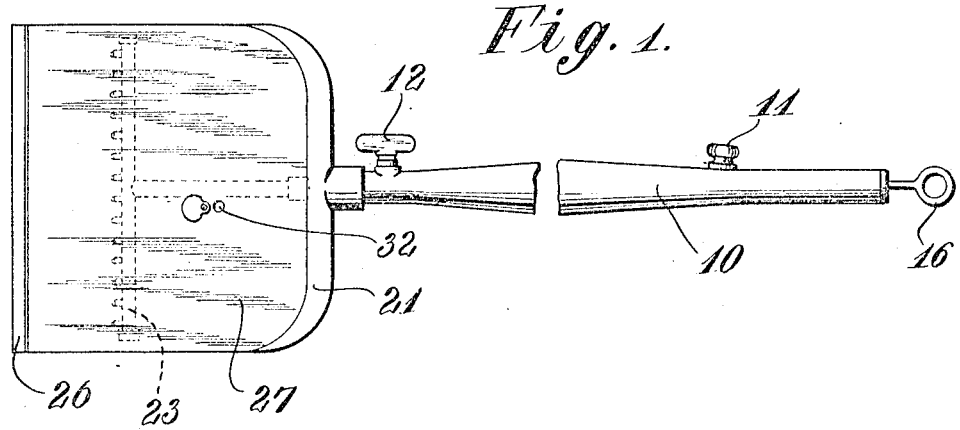
Figure 1 is a top plan view of an implement made in accordance with the invention.
Figure 2:
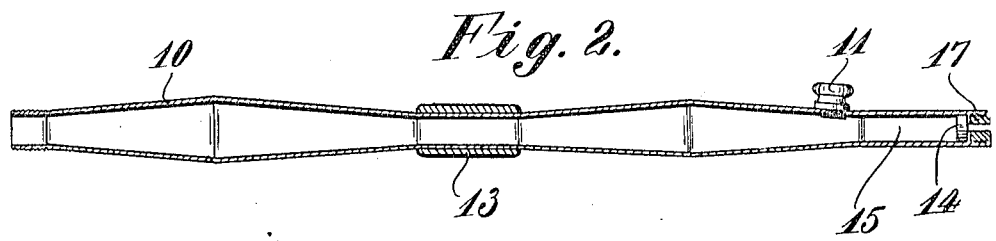
Fig. 2 is a longitudinal sectional view through the handle.
Figure 3:
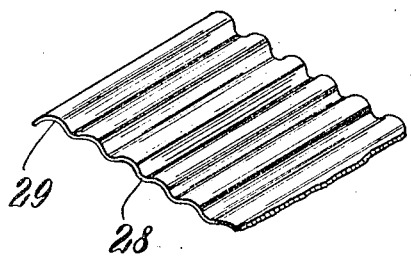
Fig. 3 is a fragmental perspective view of the heat directing plate.
Figure 4:
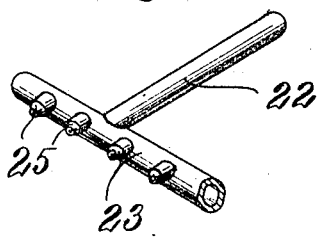
Fig. 4 is a fragmental perspective view of the burner.

The implement consists of a handle 10, which is made from a tube formed in the shape of a pair of reversed cones, the hollow interior acting as a reservoir for gasolene or other inflammable liquids, the same being supplied through a filling nozzle 11 near the outer end, the outlet being controlled by a valve 12 and a grip band 13 applied at the center.

In the extreme outer end of the handle is a piston 14 adapted to operate in the cylindrical part 15 of the handle by means of the extending stemmed ring 16 which passes through a cap 17 rigidly set at the end of the tube.

Engaged at the opposite end of the handle is a cross-shaped fitting 20 from the two lateral oppositely disposed openings of which extend an integral frame 21, while opposite the handle 10 is a feed pipe 22 extending to a header 23, so as to conduct gasolene or the like thereto, the header having connected a plurality of regularly spaced burners 25, directed toward the edge 26 of the plate or blade 27 which is rigidly engaged with the tubes 21 at its rear edge and made of relatively thin metal.

Between the header 23 and the removable hardened edge 26 of the blade is a corrugated plate having raised portions 28 between which are formed longitudinal depressions 29, the latter being in register with the burners 25 so as to direct the flames and heat directly toward the edge. A small quantity of gasolene is entered into the starting cup 30, through an opening 32, formed in the blade 27, the starting cup being held by loops 31 to the pipe 22, centrally of the blade below the opening; upon the gasolene being ignited, heat is transmitted to the pipe 22 vaporizing the gasolene in its passage to the header 23, and also tending to heat the blade.

Below the cup 30 and extending from side to side of the blade 27 is a fixed bottom plate 35, having an opening 36 at its center, the same being normally covered by a plate 38 having a hinge 39 engaged with the plate 35, the opposite end of the cover plate being secured by the hook catch 40, the hook of which engages with the fixed plate 35.

As the gasolene contained in the handle becomes decreased, the pressure may be renewed by operating the handle 16 in the manner of a pump supplying the necessary air pressure.

In operation, the implement is used in the manner of an ordinary shovel, and as it is advanced against a bank or accumulation of snow, the latter is melted under the influence of the heat from the burners 25 in an obvious manner.

Having thus described my invention, what I claim as new, and desire to secure by Letters Patent, is:—

1. In an implement of the class described, the combination with a blade, and a handle element rigidly engaged therewith, of means permitting the filling of said handle with liquid, means for controlling the passage of the liquid, a header transversely disposed on said blade, connections between said header and said handle, a plurality of burners engaged with said header directed toward the edge of said blade, means on said blade for directing the flames from said burners, and means for gasifying the contents of said handle prior to its entering said header.

2. In an implement of the class described, the combination with a rigid plate and a tubular handle engaged therewith, said handle being adapted to act as a reservoir, of a filling means in said handle, a control means on said handle adjacent to said blade, means for creating pressure within said handle, a hollow transverse member fixed on said blade, a header disposed on said blade, a plurality of burners engaged with said header, connections between said header and said handle, a dish suspended by said connecting means, said dish being adapted to contain a quantity of inflammable material, and a corrugated plate fixed on said blade contiguous to the edge thereof, said corrugations being adapted to direct heat from said burners.

In testimony whereof I have affixed my signature this 23rd day of January, 1917.

WILLIAM GÖRGEY.